S. W. GRAHAM.
UNIVERSAL JOINT.
APPLICATION FILED DEC. 6, 1909.
1,037,614.
Patented Sept. 3, 1912.
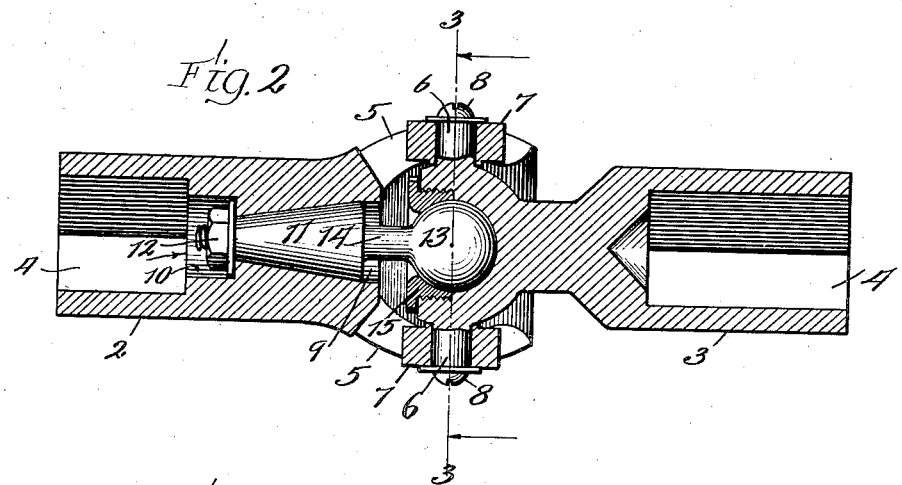
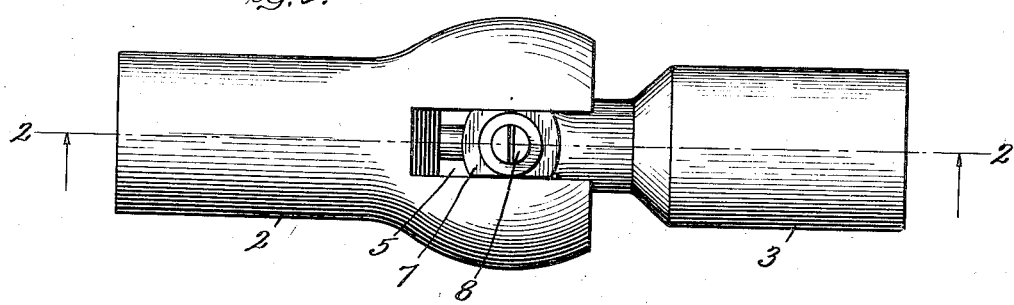
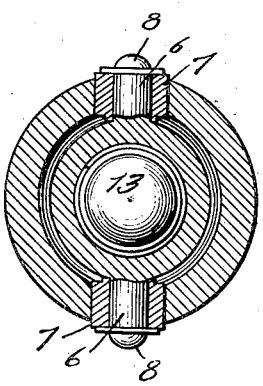
Witnesses
Inventor
S. W. Graham
By H. Sanders
Attorney

UNITED STATES PATENT OFFICE.

STANLEY WALLACE GRAHAM, OF HEMET, CALIFORNIA.

UNIVERSAL JOINT.

1,037,614.  Specification of Letters Patent.  Patented Sept. 3, 1912.

Application filed December 6, 1909. Serial No. 531,680.

*To all whom it may concern:*

Be it known that I, STANLEY WALLACE GRAHAM, a citizen of England, residing at Hemet, in the county of Riverside and State of California, have invented certain new and useful Improvements in Universal Joints; and I do declare the following to be a full, clear, and exact description of the invention, such as will enable others skilled in the art to which it appertains to make and use the same.

This invention relates to improvements in universal joints and has for its object the production of a device of the kind that is simple and durable in construction and positive in action.

With this and other objects in view the invention consists in the construction and combination of parts to be hereinafter described in the following specification and pointed out in the claim and illustrated in the accompanying drawings which form a part of said specification.

In the drawings: Figure 1 is a plan view of my invention complete. Fig. 2 is a vertical cross section in elevation taken on line 2—2. Fig. 3 is a section on line 3—3 of Fig. 2.

Like reference characters indicate corresponding parts throughout the several views.

My invention comprises preferably two shaft-like members 2 and 3 having their relatively remote extremities squared internally as at 4 to receive the ends of shafts to be coupled; the engaged extremities of said members 2 and 3 are respectively shell-like and solid, the former surrounding the latter, and the shell-like extremity of shaft-like member 2 being formed with two diametrically opposed longitudinal slots 5 through which extend prongs 6 of member 3, made integral therewith, and secured against lateral oscillation within longitudinal slots 5 by a suitable sliding block 7 and screw 8 engaging an internal thread of prong 6. The intermediate portion of member 2 is provided with an internal longitudinal opening 9 converging toward the internally squared extremity of said member and terminating in a square opening 10.

11 is a conical member secured within opening 9 by a nut 12 and having a ball member 13 connected therewith by a rod-like extension 14 of said member. Ball member 13 rests in a socket in the engaged extremity of member 3. A clamping ring 15 suitably locked within the opening in the engaged extremity of member 3 affords means of adjustment for ball member 13.

Having fully described my invention, what I claim is:

A universal joint consisting of one shaft-section terminating at one extremity in an enlarged shell provided with oppositely-located parallel longitudinal slots, with a conical aperture receding from said shell and terminating in an enlarged opening 10, a ball supporting member disposed within said conical aperture, a ball made integral with the last named member and adjusting means at the other end of said member; a second shaft-section having a socket formed in one extremity to receive said ball, a clamping ring removably secured in said socket and bearing upon said ball, oppositely-disposed prongs made integral with said second shaft-section and disposed within the longitudinal slots of the other shaft-section and sliding blocks arranged on said prongs capable of oscillation in the plane of the said shaft sections.

In testimony that I claim the foregoing as my own I have hereto affixed my signature in the presence of two subscribing witnesses.

STANLEY WALLACE GRAHAM.

Witnesses:
 J. H. SPENCER,
 E. M. JOHNSON.